United States Patent
Argyros et al.

(10) Patent No.: US 10,664,784 B2
(45) Date of Patent: May 26, 2020

(54) ANALYZING PRODUCT IMPACT ON A SYSTEM

(71) Applicant: International Business Machines Corporation, Armonk, NY (US)

(72) Inventors: Kelly A. Argyros, Fairfax, VA (US); Donna K. Byron, Petersham, MA (US); Lakshminarayanan Krishnamurthy, Round Rock, TX (US); Joan W. Tomlinson, Alexandria, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

(21) Appl. No.: 15/822,918

(22) Filed: Nov. 27, 2017

(65) Prior Publication Data

US 2019/0164093 A1 May 30, 2019

(51) Int. Cl.
*G06Q 10/00* (2012.01)
*G06Q 10/06* (2012.01)
*G06Q 30/02* (2012.01)

(52) U.S. Cl.
CPC ..... *G06Q 10/0635* (2013.01); *G06Q 30/0282* (2013.01)

(58) Field of Classification Search
None
See application file for complete search history.

(56) References Cited

U.S. PATENT DOCUMENTS

| 8,478,628 B1* | 7/2013 | Schlarman | G06Q 10/06 705/7.28 |
| 2003/0065978 A1 | 4/2003 | Adams | |
| 2005/0182722 A1* | 8/2005 | Meyer | G06Q 10/06 705/40 |
| 2008/0319922 A1* | 12/2008 | Lawrence | G06Q 20/04 705/36 R |
| 2009/0281856 A1* | 11/2009 | Meyer | G06Q 10/0635 705/7.28 |

(Continued)

FOREIGN PATENT DOCUMENTS

WO  2006125724 A1  11/2006

*Primary Examiner* — Joseph M Waesco
(74) *Attorney, Agent, or Firm* — Cuenot, Forsythe & Kim, LLC

(57) ABSTRACT

A method, in a data processing system comprising a processor and a memory, for analyzing product impact, the method comprising receiving, by the data processing system, data representative of an entity's operations, receiving, by the data processing system, a selection of one or more products, parsing, by the data processing system, features of the one or more products from product data input, and generating, by the data processing system, product profiles for the one or more products based on the parsed features. The method further comprising generating, by the data processing system, risk assessment data based on the data representative of the entity's operations and the product profiles, the risk assessment data including an indication of one or more changes in risk metrics of one or more risk components associated with the entity's operations by offering the one or more products.

17 Claims, 4 Drawing Sheets

(56) References Cited

U.S. PATENT DOCUMENTS

| | | | |
|---|---|---|---|
| 2009/0319420 A1* | 12/2009 | Sanchez | G06Q 40/00 705/38 |
| 2011/0153383 A1* | 6/2011 | Bhattacharjya | G06Q 10/0635 705/7.28 |
| 2012/0029970 A1* | 2/2012 | Stiles | G06Q 10/06 705/7.28 |
| 2012/0116839 A1* | 5/2012 | Akkiraju | G06Q 10/06 705/7.28 |
| 2012/0203590 A1 | 8/2012 | Deb et al. | |
| 2012/0221486 A1* | 8/2012 | Leidner | G06Q 10/0635 705/36 R |
| 2013/0332194 A1* | 12/2013 | D'Auria | G16H 10/60 705/3 |
| 2014/0258032 A1* | 9/2014 | Psota | G06Q 30/02 705/26.35 |
| 2014/0344130 A1* | 11/2014 | Lawrence | G06Q 20/04 705/35 |
| 2015/0019406 A1* | 1/2015 | Lawrence | G06Q 40/08 705/38 |
| 2015/0277864 A1* | 10/2015 | Muramatsu | G06F 8/41 717/140 |
| 2016/0196587 A1* | 7/2016 | Eder | G06Q 30/00 705/14.49 |
| 2016/0232193 A1* | 8/2016 | Bahrs | H04L 41/5019 |
| 2016/0321582 A1* | 11/2016 | Broudou | G06N 5/025 |
| 2016/0360382 A1* | 12/2016 | Gross | G06F 3/04883 |
| 2017/0206604 A1* | 7/2017 | Al-Masoud | G06Q 40/04 |
| 2017/0300656 A1* | 10/2017 | Cox | G16H 50/30 |
| 2018/0018602 A1* | 1/2018 | DiMaggio | G06Q 30/018 |
| 2018/0218167 A1* | 8/2018 | Narayanaswamy | G06F 21/6218 |
| 2018/0218453 A1* | 8/2018 | Crabtree | G06Q 30/0202 |
| 2018/0276339 A1* | 9/2018 | Planey | G06N 5/04 |
| 2018/0276728 A1* | 9/2018 | Psota | G06Q 30/0241 |
| 2018/0357714 A1* | 12/2018 | So | G06N 20/00 |
| 2019/0012478 A1* | 1/2019 | Narayanaswamy | G06F 21/6209 |

* cited by examiner

ANALYZING PRODUCT IMPACT ON A SYSTEM

BACKGROUND

The present invention generally relates to software analysis, and in particular, a product assessment method and system that extracts features from a product, searches the features to identify impact on operating components, and summarizes the risks for user review.

An organization can offer various products to their customers in order to provide the most appropriate service that will fit its customers' needs. Each product typically covers a set of features, some of which may be distinct from other products. Because of this, each product may impose different types of requirements and resources on the organization. These different types of requirements and resources are also associated with their own risk levels and impact the overall system risk for the organization.

SUMMARY

A method, computing system, and computer program product for analyzing product impact are disclosed. According to one embodiment, said method is in a data processing system comprising a processor and a memory, and comprises receiving, by said data processing system, data representative of an entity's operations. A selection of one or more products is received by said data processing system. Features of said one or more products are parsed by said data processing system from product data input. Product profiles are generated for said one or more products based on said parsed features by said data processing system. Said method further comprises generating, by said data processing system, risk assessment data based on said data representative of said entity's operations and said product profiles, said risk assessment data including an indication of one or more changes in risk metrics of one or more risk components associated with said entity's operations by offering said one or more products.

Data representative of said entity's operations may include assets, investments, holdings, obligations, provided services, functions, contracts, third-party services, security, technology, or processes. Receiving data representative of said entity's operations may further comprise receiving data from manual user entries, files, data records, tables, or maps of said entity's operations. Said one or more products may include software, policies, contracts, transactions, and services. In one embodiment, said product data input comprises an upload or export of data associated with said one or more products from at least one of data files, source code, and product documentation.

Parsing features of said one or more products may further comprise extracting words, numbers, and characters from source code, specific files, filenames, metadata, or content from said product data. Additionally, parsing features of said one or more products may further comprise analyzing said extracted words, numbers, and characters using natural language processing (NLP). Said method may further comprise classifying said one or more products based on said analysis, identifying requirements of said one or more products based on said analysis, and identifying elements of said entity's operations that said one or more products impact based on said analysis. In another embodiment, said method may further comprise determining effects of said one or more products on said risk metrics of one or more risk components, and determining duration of said effects on said risk metrics of said one or more risk components.

Risk metrics may include measurements of said entity's operations that are associated with said one or more risk components. One embodiment includes said one or more risk components that correlate to aspects of said entity's operations such as, threat risk component, legal risk component, liability and obligation risk component, and vulnerability risk component. Said risk assessment data may include cumulative risk scores for said one or more risk components via an aggregation of values assigned to said risk metrics.

According to one embodiment, said computing system comprises a computer processor and a computer memory operatively coupled to said computer processor. Said computer memory having disposed within it computer program instructions that, when executed by said processor, cause said computing system to receive data representative of an entity's operations. Said computer program instructions also causes said computing system to parse product features from one or more files and codes corresponding to one or more products. Said computer program instructions may further cause said computing system to generate risk assessment data based on said data representative of said entity's operations and said product features, said risk assessment data including an indication of one or more changes in risk metrics of one or more risk components associated with said entity's operations by offering said one or more products.

Data representative of said entity's operations may include assets, investments, holdings, obligations, provided services, functions, contracts, third-party services, security, technology, or processes. Said one or more products may include software, policies, contracts, transactions, computing services, and consulting services. Parsing said product features by the computing system may further comprise said computing system analyzing words, numbers, and characters from said one or more files and codes using natural language processing (NLP).

According to one embodiment, said computer program product comprises a computer readable storage medium having stored thereon program instructions executable by a processing device to cause said processing device to receive data representative of an entity's operations. Said computer readable storage medium may also store program instructions executable by said processing device to cause said processing device to parse product features from one or more files and codes corresponding to one or more products. Said computer readable storage medium may further store program instructions executable by said processing device to cause said processing device to generate risk assessment data based on said data representative of said entity's operations and said product features, said risk assessment data including an indication of one or more changes in risk metrics of one or more risk components associated with said entity's operations by offering said one or more products.

Said computer readable storage medium may further store program instructions executable by said processing device to cause said processing device to parse said product features from manual user entries, files, data records, tables, or maps of said entity's operations. Said one or more products may include software, policies, contracts, transactions, or services. In one embodiment, said computer readable storage medium stores program instructions executable by said processing device to cause said processing device to analyze words, numbers, and characters from said one or more files and codes using natural language processing (NLP).

DETAILED DESCRIPTION

Figure 1:
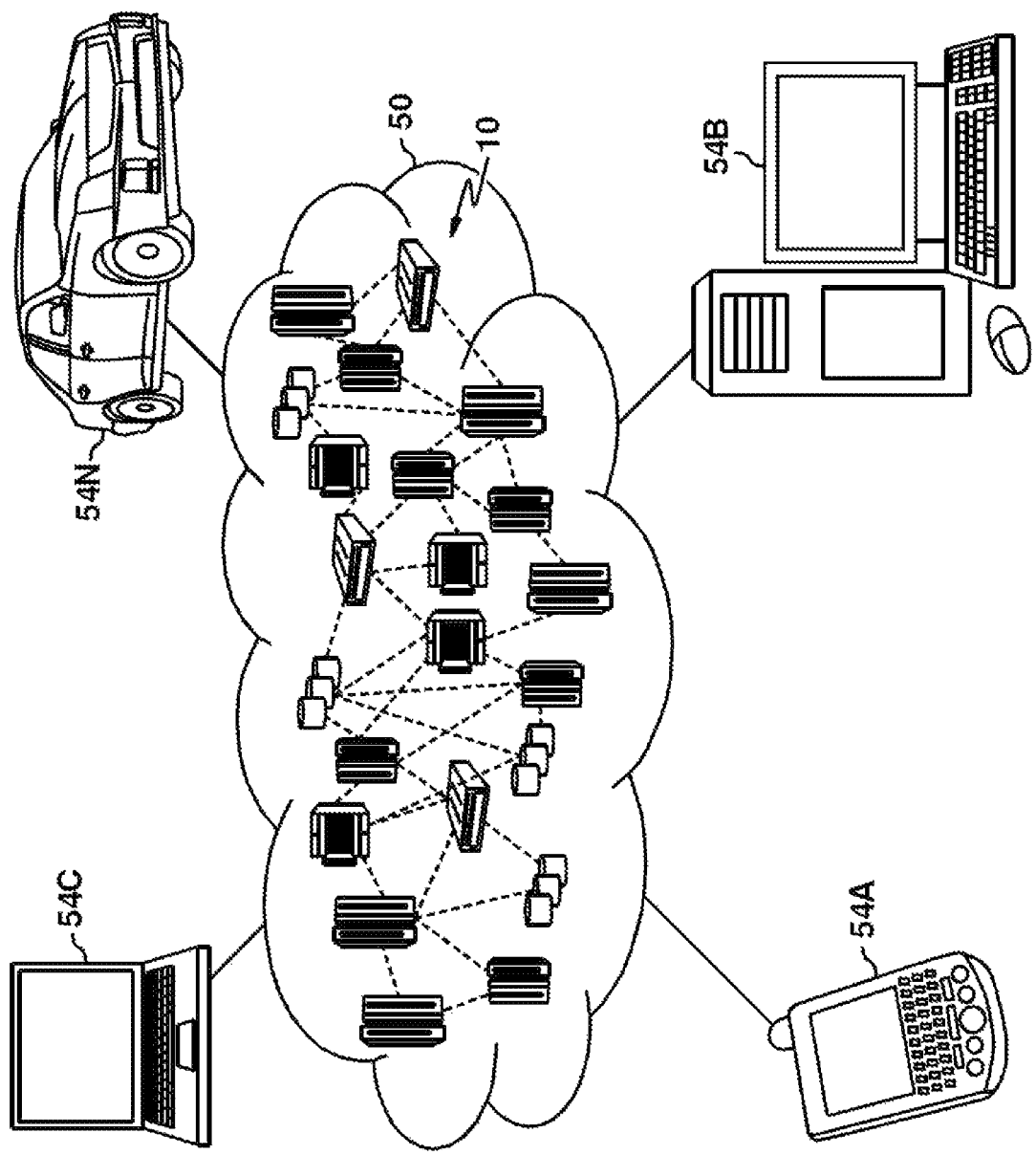
FIG. 1 depicts a cloud computing environment according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses exemplary methods, computing systems, and computer program products for analyzing one or more products offered by an entity and provide risk assessment of the entire entity resulting from obligations that may be imposed in view of the one or more products. In one embodiment, a system may receive a description of a product offered by an entity and analyzes the features provided by the offered product. The features can be extracted from the description based on natural language processing (NLP) algorithms. The system may identify product characteristics such as obligations that need to be in compliance based on the analyzed features of the offered product. The system can generate a risk assessment of the product based on the identified obligations and determine an overall assessment of the organization based on the product risk assessment.

Exemplary methods, computing systems, and computer program products for evaluating products that may impact an aggregated risk for an entity, in accordance with the present invention, are described with reference to the accompanying drawings. The evaluation may include processing data related to a plurality of risk metrics for the entity and identifying a change in at least one of the risk metrics. The risk metrics may include measurements of the entity's operations (e.g., physical and virtual assets, investments, holdings, obligations, provided services, functions, contracts, third-party services, technology, and processes) that are associated with one or more risk components. The data related to the entity's operations may be collected or extracted from any hardware that produces data relevant the entity's operations, such as, computers, servers, mobile computing devices, and databases, etc. The risk metrics can be used to determine whether a change in the entity's operations (e.g., by offering a new product) can potentially affect the risk status of their business objectives. For example, each entity may specify what type of security risk metrics are to be monitored in relation to each risk component category.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
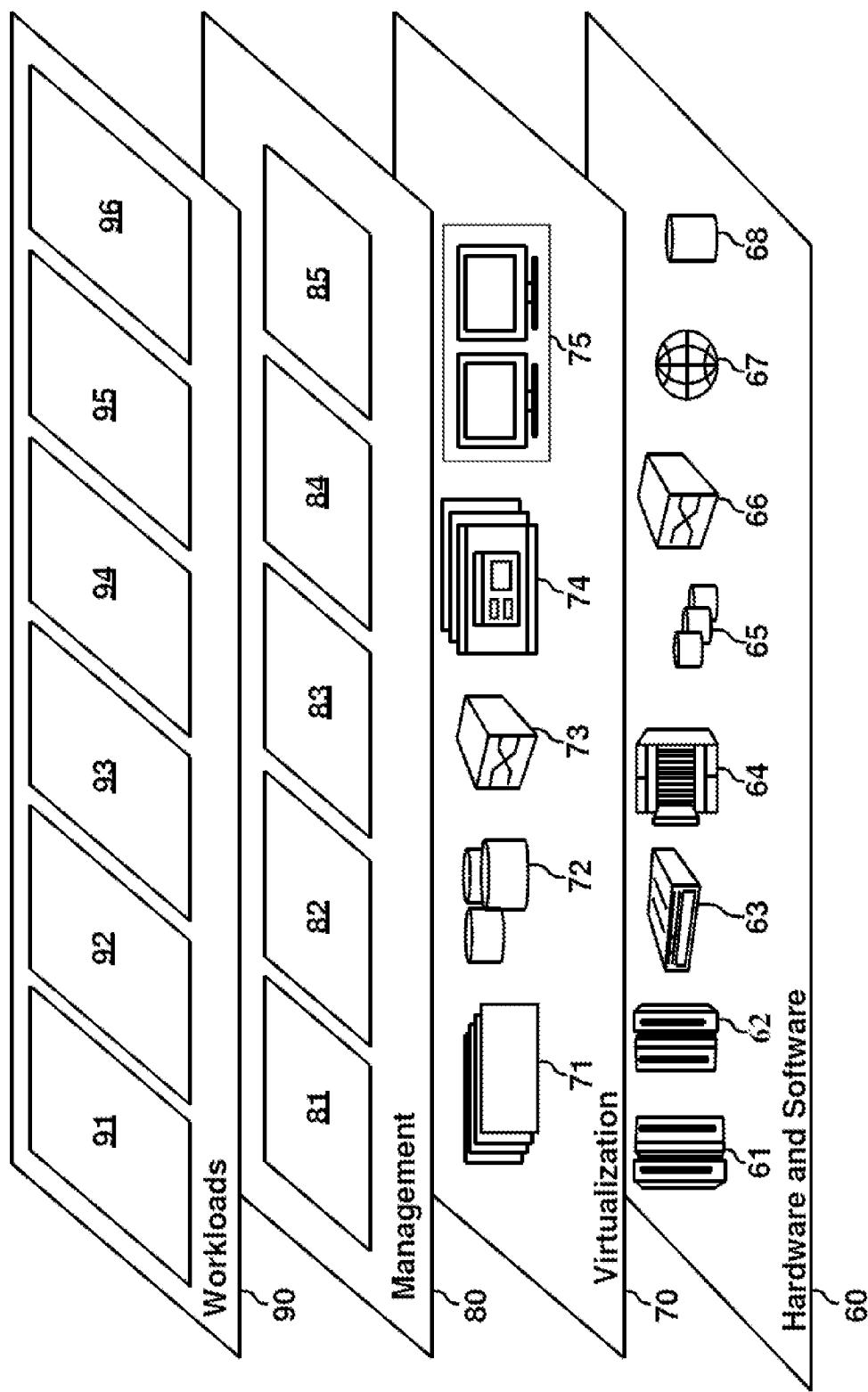
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and product risk analysis processing 96.

Figure 3:
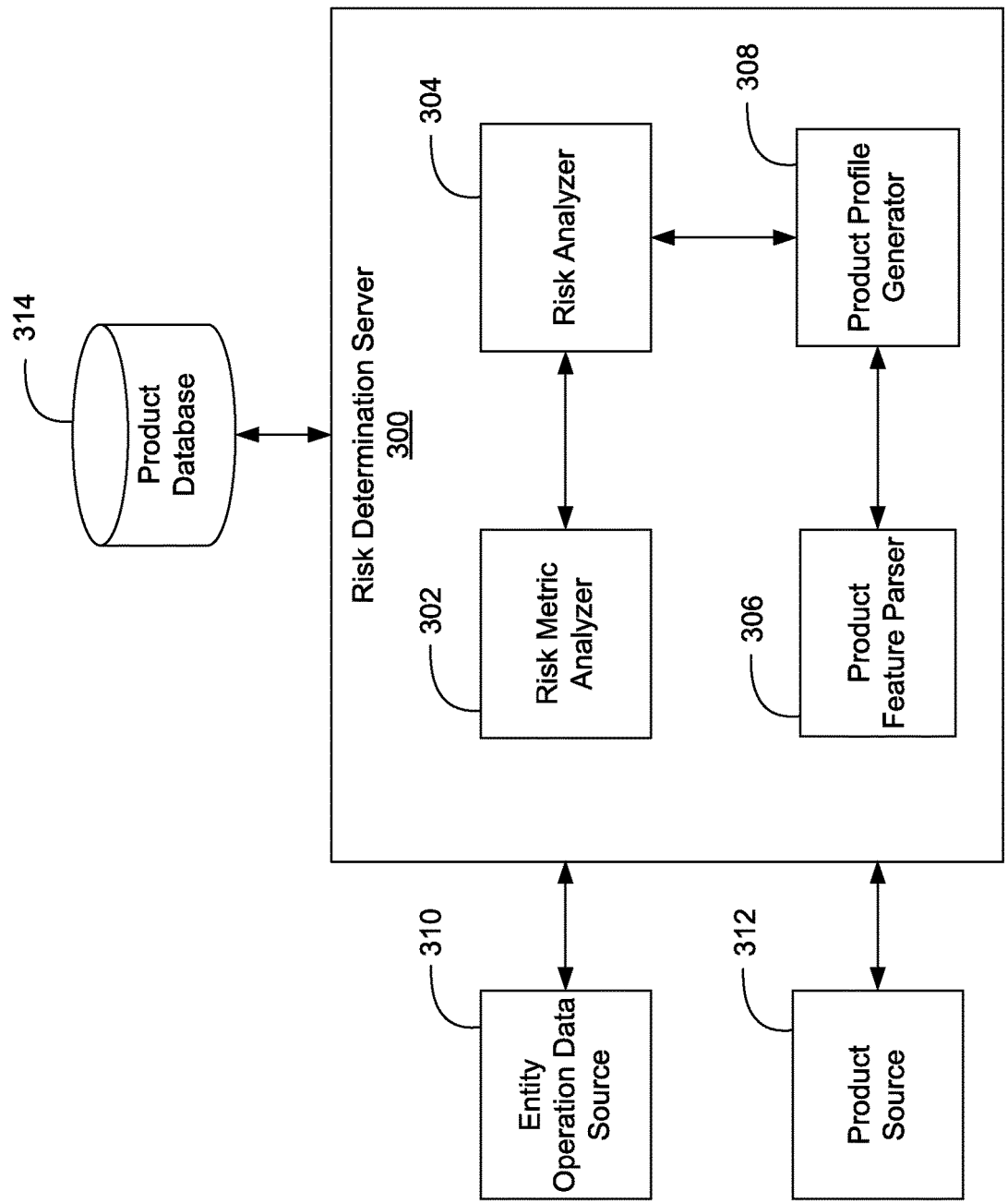
FIG. 3 illustrates a logical block diagram of a computing system according to an embodiment of the present invention.

FIG. 3 presents a logical block diagram of a computing system for analyzing product impact according to an embodiment of the present invention. The present invention is not limited to the arrangement of devices in the exemplary system illustrated in FIG. 3, but rather are for explanation. Computing systems useful according to various embodiments of the present invention may include additional servers, routers, other devices, and peer-to-peer architectures, not shown in FIG. 3, as understood by those of skill in the art.

The system includes automated computing machinery comprising the risk determination server 300 according to embodiments of the present invention. The risk determination server 300 includes at least one computer processor or "CPU" as well as random access memory ("RAM") which is connected through a high-speed memory bus and bus adapter to the processor and to other components of the server. Stored in RAM, or a hard drive connected to the RAM, may include computer program instructions that, when executed, cause the computer to analyze a product to calculate the product's impact on an entity's operations according to embodiments of the present invention.

A risk analyzer 304 may retrieve a product profile from product database 314 for a given target product. The target product may comprise e.g., software, policies, contracts, transactions (e.g., financial), computing services (e.g., storage, cloud computing, networking), and consulting services, that may be embodied in an electronic form and analyzed by risk analyzer 304 for operational risk if offered or provided by an entity. Product database 314 may store product profiles including details and functions of previously retrieved and/or stored products. If the target product is not available in product database 314, product profile generator 308 is capable of creating a profile for the target product based on features parsed by product feature parser 306.

Product feature parser 306 may retrieve details of a target product from product source 312. Product source 312 may include data representative of the target product, such as, data files, source code, and product documentation (including, e.g., instructions, warranty, prospectus, brochures, marketing, diagrams, tables, and charts). The product source 312 may be received from a user device, e.g., by a product salesperson, a product development team, product architect, and/or product manager. The product feature parser 306 may parse features from product source 312 by using natural language processing (NLP) to analyze text, numbers, characters, etc. NLP is a field of computer science, artificial intelligence, and linguistics concerned with the interactions between computers and human (natural) languages. NLP may include natural language understanding, e.g., enabling product profile generator 308 to derive meaning from natural language input from product source 312. With the use of NLP, product feature parser 306 is able to provide information to product profile generator 308 to classify the target product, identify its requirements and expected results or output produced by the product, and create a profile for the target product.

Risk metric analyzer 302 may retrieve data that is representative of the entity's operations (e.g., physical and virtual assets, investments, holdings, obligations, provided services, functions, contracts, third-party services, security, technology, and processes) and evaluate the entity according to a plurality of risk metrics. The risk metrics may measure operational integrity associated with risk components (e.g., threats (such as security or financial), legal compliance, liabilities and obligations, ethical violations, social media/public relations, vulnerabilities, and incidents) for the entity. The data from the entity's operations may be extracted, collected, and/or analyzed by risk metric analyzer 302, from entity operation data source 310. Entity operation data source 310 may comprise data representative of any of the entity's assets, such as, computers, mobile computing devices, servers, databases. Alternatively, the entity operation data source 310 may comprise a data input such as manual user entries, files, data records, tables, or maps of the entity's operations.

Risk metrics data may be generated by risk metric analyzer 302 according to the data from the entity's operations. That is, risk metrics may be created based on aspects of the entity's operations, such as, technology, services, compliance, assets, financial, security, etc. The risk metrics may differ depending on risk component, the type of entity (e.g., certain industries, companies, or organizations), the operations performed by the entity, and other relevant factors. Risk components may also include other types of data that may be specific for each entity and may be modified by the entity and dimensionally limited by a focus on specific aspects of risk as they relate to a specific entity. The entity may request analysis and specify a list of risk components or risk component categories associated with specific risk metrics. For example, the risk determination server 300 may receive a selection related to a specific component of a specific type of risk associated with the system. The type of risk can be a security risk on the entity. The specific components of the security risk can include negative risks to the entity associated with a loss caused by the security risk.

Risk analyzer 304 may calculate an overall impact of the target product on the operations of the entity and generate risk assessment data based on data from risk metric analyzer 302 and the product profile of the target product (from either product profile generator 308 or product database 314). Calculating the overall impact and generating the risk assessment data may include identifying a change in at least one of the risk metrics associated with one or more risk components of the entity's operations if the target product is incorporated into the entity's operations. A change in the at least one of the risk metrics may indicate that there may be a potential an issue related to the entity (e.g., threat, vulnerability, or incident). For example, the risk assessment data may include a plurality of threats related to the operational integrity of the entity (e.g., spam pushing and pharming, malware, unauthorized access, abuse of access privilege, legal and regulatory threats, damage to hardware, loss of hardware/assets/investments, human error and social engineering, change, etc.). Generating risk assessment data may also include determining vulnerabilities related to the operational integrity of the entity if it includes the target product (e.g., security and regulatory awareness, security organization and resources, supplier security, location security, process control, change control, data control, mobile device control, legacy system security, security architecture, etc.). In another example, the risk assessment data may include incidents related to the operational integrity of the entity (e.g., insider attack, malware attack, web-based attack, legal or regulatory action, physical damage or loss, website defacement, failed service management, email attack, adverse publicity, DDos attack, etc.).

According to one embodiment, risk analyzer 304 may include a simulator capable of simulating the effects of incorporating the target product (based on the target product profile) into the entity's existing operations or offerings. For example, product profile generator 308 may create a target product profile that identifies a set of obligations that need to be in compliance based on the analyzed features of the offered product. The risk analyzer 304 may generate risk assessment data based on the identified obligations, and determine the overall risk assessment of an entity based on the product risk assessment and the context within which the entity operates based on risk metric data from risk metric analyzer 302. As such, a user may be allowed to manage the overall risk to the entity by analyzing the broad effect which a new product offering (e.g., the target product) may have on the business of the entity. Generating risk assessment data by the risk analyzer 304 may further include analyzing risk metrics of the entity to determine if at least one risk metric exceeds a threshold by incorporating the target product. A threshold may be set for the risk metrics and can be monitored for when the metric exceeds that threshold.

Figure 4:
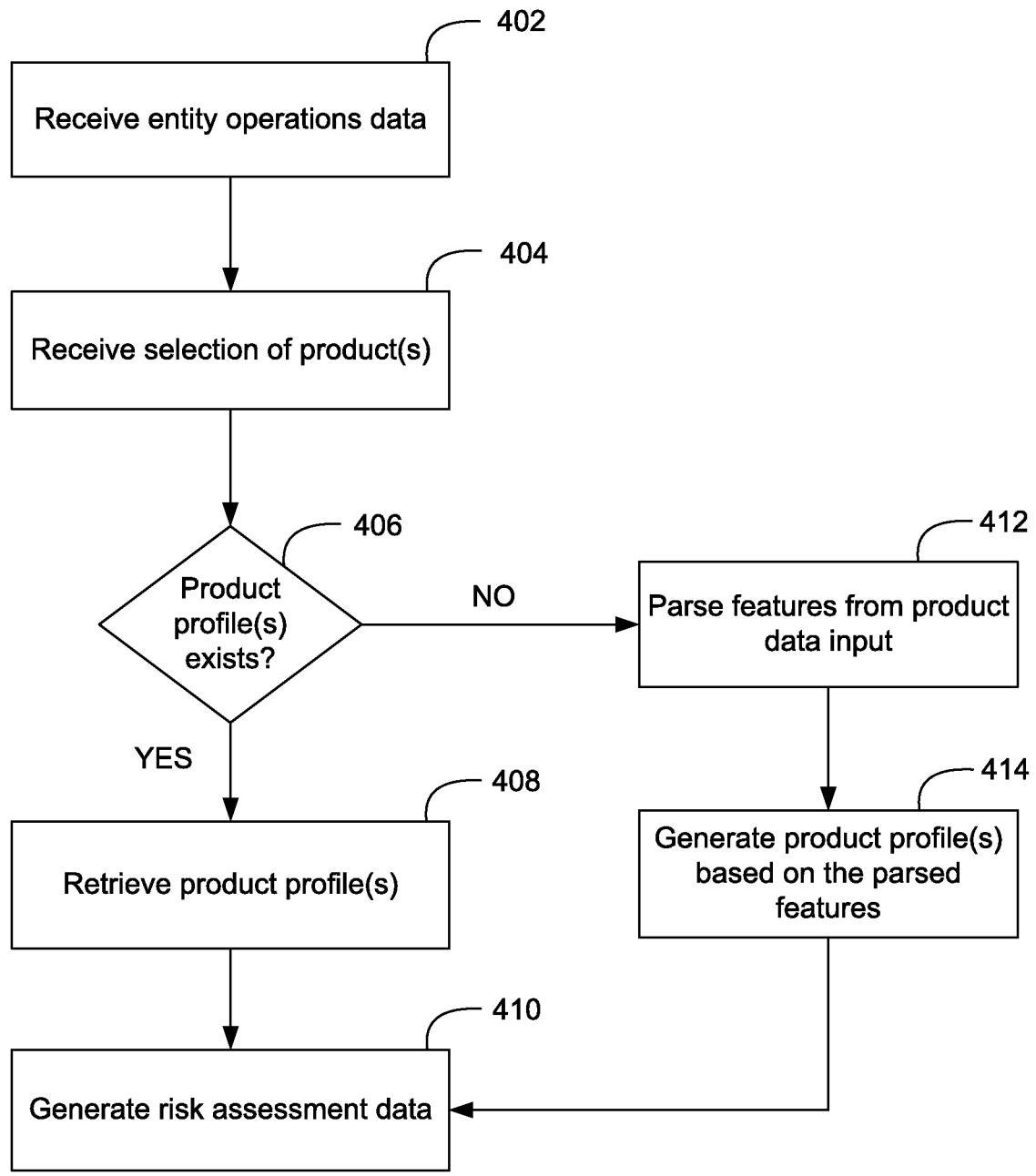
FIG. 4 illustrates a flowchart of a method for analyzing product impact according to an embodiment of the present invention.

FIG. 4 presents a flowchart of a method for analyzing product impact according to an embodiment of the present invention. Entity operations data is received, step 402. Receiving the entity operations data may include a data processing system obtaining data that is representative of an entity's operations. The data representative of the entity's operations may include physical and virtual assets, investments, holdings, obligations, provided services, functions, contracts, third-party services, security, technology, and processes. The entity operations data may be received from any of the entity's assets, such as, computers, mobile computing devices, servers, databases. According to one embodiment, receiving the entity operations data includes receiving a data input or import of data such as manual user entries, files, data records, tables, or maps of the entity's operations. In an alternative embodiment, the data processing system may be allowed by the entity to broadly probe, analyze, and gather information directly from hardware of the entity's operations (e.g., servers, databases, and file systems).

A selection of one or more products are received, step 404. A user may indicate a selection of one or more products for analysis in conjunction with the entity operations data to the data processing system. The products may comprise e.g., software, policies, contracts, transactions (e.g., financial), computing services (e.g., storage, cloud computing, networking), and consulting services that the entity desires to offer via its operations (represented by the entity operations data).

The data processing system may retrieve details of the one or more products from either a product database or a product data input. A determination is made by the data processing system whether product profiles for the one or more products exists in the product database, step 406. The product database may store product profiles including details and functions of previously retrieved and/or stored products. If product profiles for the products exist in the product database, the product profiles are retrieved by the data processing system, step 408, and the data processing system may proceed to step 410. Otherwise, if the products are not available from the product database, features of the products may be parsed by the data processing system from product data input, step 412. The product data input may comprise an upload or export of product data. The product data may include, for example, data files, source code, and product documentation (including, e.g., instructions, warranty, prospectus, brochures, marketing, diagrams, tables, and charts).

Parsing features from the product data input may include extracting words, numbers, characters, etc., from source code, specific files, filenames, metadata, or content from the product data. Feature parsing may also include the data processing system using NLP to analyze and derive meaning from the extracted words, numbers, characters, etc., to classify each product, identify their requirements, identify elements of the entity's operations that the products impact, and determine the products' effect(s) and duration of the effect(s) on risk metrics for one or more risk components. Certain words or strings of characters may be assigned to one or more tags identifying particular features and are stored in a dictionary. For example, the words "hedge," "collateral," and "leverage" may indicate particular features of a financial product that are associated with certain operational requirements, risks, and obligations. In another embodiment, the certain words or strings of characters may be used to train a classifier via machine learning (e.g., using machine learning techniques such as neural networks) to help identify product features. Product profiles are generated for each of the one or more products based on the parsed features, step 414. The product profiles include information associated with the parsed features, e.g., product classification, requirements, elements of the entity's operations that the products impact, and products' effect(s) and duration of the effect(s) on risk metrics for one or more risk components.

Upon retrieving (step 408) or generating the product profiles (step 414), risk assessment data is generated based on the entity operations data and the product profiles, step 410. Generating risk assessment data may include the data processing system identifying a change in at least one risk metric associated with one or more risk components of the entity's operations, the change effected by an addition of the one or more products to the entity's operations. A change in the at least one of the risk metrics may indicate a potential issue with the one or more products on the entity's existing operations. The risk metrics may include measurements of the entity's operations (e.g., physical and virtual assets, investments, holdings, obligations, provided services, functions, contracts, third-party services, technology, and processes) that are associated with one or more risk components. Each risk component may correlate to a given aspect of the entity's operations, e.g., threat risk component, legal risk component, liability and obligation risk component, vulnerability risk component, etc.

Generating risk assessment data for an entity may depend on what data can be gathered from the entity's operations from step 402. Risk metrics may be defined in a predetermined catalogue that may be used by any entity. Such catalogue may be fully designated within a framework of predetermined risk component categories. According to one embodiment, each entity may specify what type of risk metrics are monitored in relation to each risk component category. Risk assessment data may be used to create a report or populate fields on a user interface including risk metrics for one or more risk components pertaining to an entity's operations.

The risk assessment data may include cumulative risk scores or ratings of the entity's operations before and after an introduction of a product into the entity's operations. The risk scores can reflect the health of the entity's operations (e.g., on a scale from '1' to '10' where a score of '1' reflects a poor rating while a score of '10' reflects an excellent rating). A cumulative risk score may be calculated for each risk component via an aggregation of values assigned to a plurality of risk metrics. For example, the plurality of risk metrics may be comprised of sets of descriptions. Each set of descriptions may comprise descriptions that cumulatively characterize a risk component of an entity's operation. That is, each description of the set of descriptions can provide a characterization of a portion of a range, scale, and/or continuum of possible classifications and/or quantifications of a risk component. For example, if a threat assessment of a product returns four critical risk characterizations, five high risk characterizations, one medium risk characterizations, and one low risk characterization, then a risk score can be based on a weighted aggregation of the four critical risk characterizations, five high risk characterizations, one medium risk characterizations, and one low risk characterization. In one embodiment, the higher risk characterizations (e.g., on a scale comprising critical risk to high risk to medium risk, to low risk, wherein critical is the highest risk and low is the lowest risk) can be weighted more heavily to have a greater influence on a cumulative risk score. The cumulative risk scores (as well as individual risk metric values) may be provided in a summary for user review.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIGS. 1 through 4 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, for analyzing product impact, the method comprising:
    receiving, by the data processing system and from computer assets, data representative of an entity's operations;
    receiving, by a user interface connected to the data processing system, a selection of one or more products;
    parsing, by the data processing system and using natural language processing, features of the one or more products from product data input;
    generating, by the data processing system, product profiles for the one or more products based on the parsed features; and
    generating, by a risk analyzer in the data processing system, risk assessment data based on the data representative of the entity's operations and the product profiles; and
    populating, within the user interface, fields of the user interface using risk metrics for one or more risk components associated with the entity's operations, wherein
    the risk analyzer includes a simulator configured to simulate effects of incorporating the one or more products into the entity's operations, and
    the risk assessment data includes an indication of one or more changes in the risk metrics of the one or more risk components associated with the entity's operations by offering the one or more products.

2. The method of claim 1 wherein the data representative of the entity's operations includes data selected from the group consisting of:
    assets, investments, holdings, obligations, provided services, functions, contracts, third-party services, security, technology, and processes.

3. The method of claim 1 wherein receiving data representative of the entity's operations further comprises receiving data selected from the group consisting of: manual user entries, files, data records, tables, and maps of the entity's operations.

4. The method of claim 1 wherein the one or more products is selected from a group consisting of:
    software, policies, contracts, transactions, computing services, and consulting services.

5. The method of claim 1 wherein the product data input comprises an upload or export of data associated with the one or more products from at least one of data files, source code, and product documentation.

6. The method of claim 1 wherein parsing features of the one or more products further comprises extracting words, numbers, and characters from source code, specific files, filenames, metadata, or content from the product data.

7. The method of claim 1 further comprising:
    classifying the one or more products based on the analysis;
    identifying requirements of the one or more products based on the analysis; and
    identifying elements of the entity's operations that the one or more products impact based on the analysis.

8. The method of claim 1 further comprising:
    determining effects of the one or more products on the risk metrics of one or more risk components; and
    determining duration of the effects on the risk metrics of the one or more risk components.

9. The method of claim 1 wherein the risk metrics include measurements of the entity's operations that are associated with the one or more risk components.

10. The method of claim 1 wherein the one or more risk components correlate to aspects of the entity's operations selected from the group consisting of:
    threat risk component, legal risk component, liability and obligation risk component, and vulnerability risk component.

11. The method of claim 1 wherein the risk assessment data includes cumulative risk scores for the one or more risk components via an aggregation of values assigned to the risk metrics.

12. A computing system for analyzing product impact, the computing system comprising:
    a computer processor including a risk analyzer, and
    a computer memory operatively coupled to the computer processor,
    the computer memory having disposed within it computer program instructions that, when executed by the processor, cause the computing system to perform:
        receiving, from computer assets, data representative of an entity's operations;
        receiving, by a user interface connected to the computing system, a selection of one or more products;
        parsing, using natural language processing, product features from one or more files and codes corresponding to one or more products;
        generating product profiles for the one or more products based on the parsed product features; and
        generating, by the risk analyzer, risk assessment data based on the data representative of the entity's operations and the product profiles; and
        populating, within the user interface, fields of the user interface using risk metrics for one or more risk components associated with the entity's operations, wherein
    the risk analyzer includes a simulator configured to simulate effects of incorporating the one or more products into the entity's operations, and the risk assessment data includes an indication of one or more changes in the risk metrics of the one or more risk components associated with the entity's operations by offering the one or more products.

13. The computing system of claim 12 wherein the data representative of the entity's operations includes data selected from the group consisting of:
   assets, investments, holdings, obligations, provided services, functions, contracts, third-party services, security, technology, and processes.

14. The computing system of claim 12 wherein the one or more products is selected from a group consisting of:
   software, policies, contracts, transactions, and services.

15. A computer program product for analyzing product impact, comprising: a computer readable storage medium having stored thereon: receiving, from computer assets, data representative of an entity's operations; receiving, by a user interface connected to the computing system, a selection of one or more products; parsing, using natural language processing, product features from one or more files and codes corresponding to one or more products; generating product profiles for the one or more products based on the parsed product features; and rating, by a risk analyzer, risk assessment data based on the data representative of the entity's operations and the product profiles; and populating, within the user interface, fields of the user interface using risk metrics for one or more risk components associated with the entity's operations, wherein the risk analyzer includes a simulator configured to simulate effects of incorporating the one or more products into the entity's operations, and the risk assessment data includes including an indicate or more changes in the risk metrics of the one or more risk components associated with the entity's operations by offering the one or more products.

16. The computer program product of claim 15 further comprising program instructions executable by the processing device to cause the processing device to parse the product features from the group consisting of:
   manual user entries, files, data records, tables, and maps of the entity's operations.

17. The computer program product of claim 15 wherein the one or more products is selected from a group consisting of:
   software, policies, contracts, transactions, and services.

* * * * *